(12) United States Patent
Bhatia

(10) Patent No.: US 12,174,744 B2
(45) Date of Patent: Dec. 24, 2024

(54) CENTRALIZED, SCALABLE CACHE FOR CONTAINERIZED APPLICATIONS IN A VIRTUALIZED ENVIRONMENT

(71) Applicant: VMWARE, INC., Palo Alto, CA (US)

(72) Inventor: Kashish Bhatia, Bangalore (IN)

(73) Assignee: VMware LLC, Palo Alto, CA (US)

( * ) Notice: Subject to any disclaimer, the term of this patent is extended or adjusted under 35 U.S.C. 154(b) by 42 days.

(21) Appl. No.: 18/093,841

(22) Filed: Jan. 6, 2023

(65) Prior Publication Data

US 2024/0152462 A1 May 9, 2024

(30) Foreign Application Priority Data

Nov. 8, 2022 (IN) .............................. 202241063627

(51) Int. Cl.
*G06F 12/0864* (2016.01)
*G06F 12/02* (2006.01)

(52) U.S. Cl.
CPC ...... *G06F 12/0864* (2013.01); *G06F 12/0292* (2013.01)

(58) Field of Classification Search
CPC .................. G06F 12/0864; G06F 12/0292
See application file for complete search history.

(56) References Cited

U.S. PATENT DOCUMENTS

| | | | |
|---|---|---|---|
| 10,620,871 B1* | 4/2020 | Mukku | H04L 67/1097 |
| 2016/0259590 A1* | 9/2016 | Yoshida | G06F 3/0641 |
| 2017/0206090 A1* | 7/2017 | Kirkpatrick | H04L 67/148 |
| 2018/0287902 A1* | 10/2018 | Chitalia | H04L 43/0876 |
| 2018/0341519 A1* | 11/2018 | Vyas | G06F 9/4856 |
| 2020/0226023 A1* | 7/2020 | Meiri | G06F 11/0727 |
| 2021/0141728 A1* | 5/2021 | Wang | G06F 12/1466 |
| 2022/0269657 A1* | 8/2022 | Sanders | G06F 3/0641 |
| 2023/0011468 A1* | 1/2023 | Giri | G06F 12/1491 |
| 2023/0034837 A1* | 2/2023 | Suryanarayana | G06F 9/45558 |

* cited by examiner

*Primary Examiner* — Khoa D Doan
*Assistant Examiner* — Tong B. Vo
(74) *Attorney, Agent, or Firm* — King Intellectual Asset Management

(57) ABSTRACT

The disclosure provides a method for caching data. The method generally includes receiving, from an application running in a first container, an I/O to write data in a storage virtual disk to a block associated with an LBA, determining a cache is assigned to the first container and the storage virtual disk using a container mapping table comprising a first container mapping table entry mapping the first container and the disk to the cache and a second container mapping table entry mapping a second container and the disk to the cache, writing the data to the block in the storage virtual disk and to a cache block in the cache, computing a hash of the data, adding an entry that maps the LBA to the hash in an LBA table, and adding an entry that maps the hash to the cache block and to the disk in a hash table.

20 Claims, 11 Drawing Sheets

CENTRALIZED, SCALABLE CACHE FOR CONTAINERIZED APPLICATIONS IN A VIRTUALIZED ENVIRONMENT

RELATED APPLICATIONS

Benefit is claimed under 35 U.S.C. 119(a)-(d) to Foreign Application Serial No. 202241063627 filed in India entitled "CENTRALIZED, SCALABLE CACHE FOR CONTAINERIZED APPLICATIONS IN A VIRTUALIZED ENVIRONMENT", on Nov. 8, 2022, by VMware, Inc., which is herein incorporated in its entirety by reference for all purposes.

BACKGROUND

Virtualization is a process whereby software is used to create an abstraction layer over computer hardware that allows the hardware elements of a single computer to be divided into multiple virtual computers. The software used is called a hypervisor—a small layer that enables multiple operating systems (OSs) to run alongside each other, sharing the same physical computing resources. When a hypervisor is used on a physical server (also known as a bare metal server or a host) in a data center, the hypervisor allows the physical computer to separate its OS and applications from its hardware thereby enabling the creation and management of virtual machines (VMs). The result is that each VM contains a guest OS, virtualized hardware that the OS requires to run, and one or more application(s) and their associated libraries and dependencies. Other types of virtual computing instances (VCIs) may also be used similarly as VMs.

While virtualization enables running multiple OSs on the hardware of a single physical server, containerization, on the other hand, enables deploying multiple applications using the same OS on a single VM or server. In particular, containerization is the packaging of software code with just the OS libraries and dependencies required to run the code to create a single lightweight executable, referred to as a container, which runs consistently on any infrastructure. Containers simplify delivery of distributed applications, and have become increasingly popular as organizations shift to cloud-native development and hybrid multi-cloud environments.

Kubernetes® (K8SC)) software is an example open-source container orchestration platform which enables developers to package applications into containers. Developers may create containers without Kubernetes, as well, or use other containerization platforms. Kubernetes is essentially a toolkit that enables the automation of much of the operational effort required to run containerized applications. This operational effort includes a wide range of things needed to manage a container's lifecycle, including, but not limited to, provisioning, deployment, scaling (up and down), networking, and load balancing.

In some cases, multiple containers are deployed to work cohesively as a group to manage a distributed application in a cluster. Each container used to deploy and manage the distributed application may be allocated dedicated memory for caching purposes. In particular, a cache acts as a small, fast memory that stores recently accessed data items and can be used to satisfy data requests without accessing storage. As such, the use of a cache by each container helps to reduce latency (e.g., latency associated with accessing the storage is avoided) thereby resulting in higher performance for the application. However, each container, running a different service of the distributed application, may only be able to access its own individual cache, and not be able to access a cache associated with another container used to deploy the distributed application. Accordingly, the application, as a whole, may not be able to leverage the individual caches efficiently given the application does not have a centralized view. Further, the application may not be scalable. Application scalability is the ability of an application to handle a growing number of users and load, without compromising on performance and causing disruptions to user experience.

In some other cases, as opposed to using dedicated memory, each container running in a VM may use memory of the VM as a cache. Where VM memory is used for caching purposes, however, an application writer may need to add additional business logic in the OS of the VM to secure proprietary application data and/or manage the data stored in the memory. This additional logic may result in undesirable overhead for application writers.

Accordingly, there is a need in the art for techniques to provide improved caching designs for containerized applications.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method for caching data in a virtualized computing system. The method generally includes receiving, from a first application running in a first container, a first input/output (I/O) to write first data in a storage virtual disk to a block associated with a logical block address (LBA), determining a first cache is assigned to the first container and the storage virtual disk using a container mapping table comprising a first container mapping table entry mapping the first container and the storage virtual disk to the first cache and a second container mapping table entry mapping a second container and the storage virtual disk to the first cache, writing the first data to the block in the storage virtual disk, writing the first data to a cache block in the first cache, computing a hash of the first data, adding an LBA table entry that maps the LBA to the hash in an LBA table associated with the storage virtual disk, and adding a hash table entry that maps the hash to the cache block and to the storage virtual disk in a hash table associated with the first cache.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
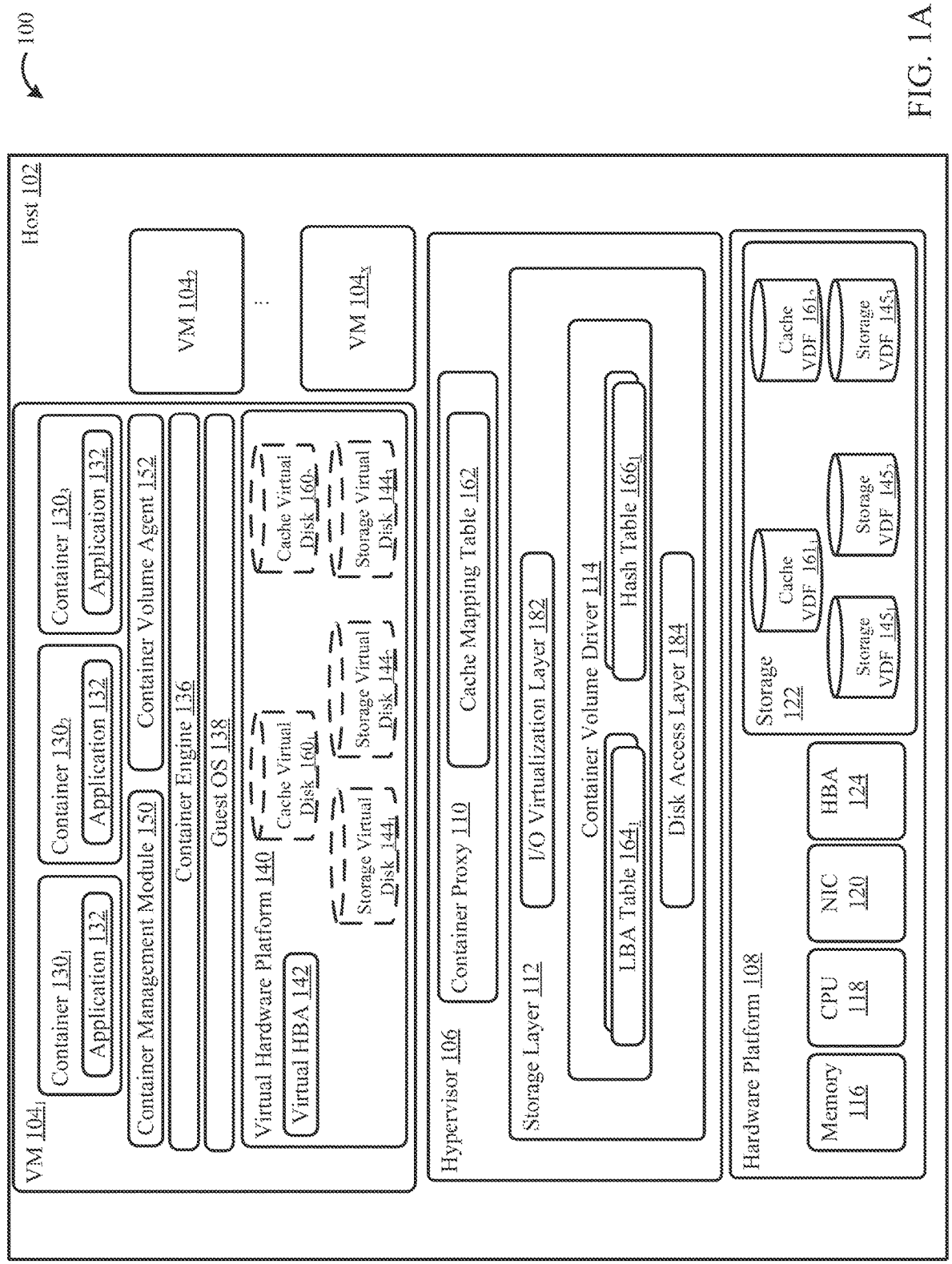
FIG. 1A depicts a computing system in which embodiments described herein may be implemented.

A scalable, centralized cache for containerized applications is described herein. For example, one or more cache virtual disks may be deployed for use by one or more containerized applications running on a host by leveraging a virtualization stack of the host. The virtualization stack is a group of software components on the host, including a hypervisor, used to support the deployment of virtual machines (VMs), containers, and/or other virtual computing instances (VCIs) containers in a virtual environment.

In particular, storage created for containers running on the host may include cache storage, in addition to traditional persistent storage, often referred to as container volumes. A container volume may be a virtual disk (also referred to herein as a "storage virtual disk" or "persistent volume") that, as is known in the art, is an abstraction of a physical storage disk that the container accesses using I/Os as though it was a physical disk. In particular, a virtual disk file is created for each virtual disk, the virtual disk file being stored in physical storage and storing the data corresponding to the virtual disk. I/Os accesses made by the container to the virtual disk are translated by the hypervisor to corresponding accesses to the virtual disk file. The purpose of a container volume is to exist independent from its container; therefore, when the container is removed, the container volume, and corresponding virtual disk file, is not automatically removed. Similarly, one or more virtual disks (e.g., persistent memory (PMem) type) may be implemented as cache virtual disks and the corresponding cache virtual disk files kept in storage attached to (or located on) a host. The cache virtual disks may be backed by corresponding cache virtual disk files stored in fast persistent memory (PMem), such as Optane™ PMem available from Intel Corporation. Cache virtual disks backed by corresponding cache virtual disk files stored in PMem are faster than the traditional storage virtual disks backed by corresponding storage virtual disk files stored in slower storage and are therefore more suitable for providing caching functionality for applications running on the host. Each cache virtual disk may be assigned to one or more containers running on the host; however, each cache virtual disk may also exist independent from its assigned container(s). Though the cache may be implemented as a cache virtual disk backed by a cache virtual disk file stored in persistent memory, other suitable data structures may be used as a cache, and may be stored in persistent storage. For example, the cache may instead be implemented as a table, array, linked list, key value store, etc., stored in persistent storage, where the later discussed hash table identifies a corresponding element of the data structure that stores the relevant data instead of specifically a cache block.

A hypervisor of the host may be responsible for creating such cache virtual disks and associating each of the created cache virtual disks with one or more of the containers having applications running thereon. More specifically, the hypervisor may be responsible for associating each of the created cache virtual disks with a storage virtual disk created for and associated with applications running inside the one or more containers. As an illustrative example, a first storage virtual disk may be created for a first application running in a first container, a second storage virtual disk may be created for a second application running in the first container, a third storage virtual disk may be created for a third application running in a second container. The hypervisor may create two cache virtual disks and (1) associate the first cache virtual disk with the first storage virtual disk (e.g., associated with the first application) and (2) associate the second cache virtual disk with the second and third storage virtual disks (e.g., associated with the second and third applications).

Further, mappings of container, storage virtual disk, and associated cache virtual disk may be maintained by the hypervisor. Using the above example, a first mapping may include the first container, the first storage virtual disk, and the first cache virtual disk, a second mapping may include the first container, the second storage virtual disk, and the second cache virtual disk, and a third mapping may include the second container, the third storage virtual disk, and the second cache virtual disk. Accordingly, when a write input/output (I/O) is issued by an application running in a container to write data to a storage virtual disk created for and associated with the application, the data may be written to both the storage virtual disk and a cache virtual disk associated with the container and the storage virtual disk. The mapping maintained by the hypervisor may be used to identify which cache virtual disk is associated with the container and the storage virtual disk such that data of the I/O may be written to the cache virtual disk accordingly. Further, when a read I/O is later issued for the previously-written data, the data may be read from the cache virtual disk, and not the storage virtual disk. In cases where the data has been evicted from the cache virtual disk, in other words, overwritten, as further described below, the read I/O will be directed to the storage virtual disk.

Data requests satisfied by the cache are executed more efficiently, thereby improving overall I/O performance of the system. Further, use of the cache may help to further improve performance by exploiting data reference locality. Data reference locality exists when data accesses tend to be near each other in time and/or space, and one type of data reference locality includes temporal locality. A data item exhibits temporal locality if it is repeatedly accessed within a short period of time. Caches may exploit this temporal locality by storing recently accessed data.

Additionally, by allowing containers to share a cache virtual disk, as opposed to each container being associated with its own, individual cache as described above, an application distributed across multiple containers may be able to leverage the centralized cache by allowing one container to read from the cache data that may have been added by another container. As such, a cache hit ratio, a measurement of how many data requests a cache is able to fulfill successfully compared to how many requests it receives, may be increased. The centralized cache may further provide scalability for an application distributed across multiple containers given one or more of the containers may utilize a same cache virtual disk.

FIG. 1A is a block diagram that illustrates a computing system 100 in which embodiments described herein may be implemented. Computing system 100 includes one or more hosts 102 configured to provide a virtualization layer, also referred to as a hypervisor 106, that abstracts processor, memory, storage, and networking resources of hardware platform 108 into multiple VMs $104_1$ to $104_X$ (collectively referred to as VMs 104 and individually referred to as VM 104) that run concurrently on the same host 102.

Each VM 104 implements a virtual hardware platform 140 that supports the installation of a guest OS 138 which is capable of executing one or more applications. Guest OS 138 may be a standard, commodity operating system. Examples of a guest OS include Microsoft Windows, Linux, and the like.

In certain embodiments, each VM 104 further includes a container engine 136 installed therein and running as a guest application under control of guest OS 138. Container engine 136 is a process that enables the deployment and management of virtual instances (referred to interchangeably herein as "containers") by providing a layer of OS-level virtualization on guest OS 138 within VM 104. Containers $130_1$ to $130_Y$ (collectively referred to as containers 130 and individually referred to as container 130) are software instances that enable virtualization at the OS level. That is, with containerization, the kernel of guest OS 138 is configured to provide multiple isolated user space instances, referred to as containers. Containers 130 appear as unique servers from the standpoint of an end user that communicates with each of containers 130. However, from the standpoint of the guest OS 138 on which the containers 130 execute, the containers 130 are user processes that are scheduled and dispatched by the OS. Examples of a container engine 136 include the open-source Docker platform made available by Mirantis, Inc. which previously acquired Docker, Inc.

Containers 130 encapsulate an application, such as application 132 as a single executable package of software that bundles application code together with all of the related configuration files, libraries, and dependencies required for it to run. Application 132 may be any software program, such as a word processing program. Bins/libraries and other runtime components are developed or executed separately for each container 130.

In certain embodiments, each VM 104 further includes a container management module 150 and a container volume agent 152. Container management module 150, in general, manages each container 130's lifecycle, including, but not limited to, creation, use, and deletion of containers 130 running on container engine 136. In certain embodiments, container management module 150 creates containers 130 based on one or more configuration files that define parameters (e.g., port mappings, storage, etc.) for the containers 130 that are to be deployed on container engine 136.

Container volume agent 152 is used to enable communication between VM 104 and hypervisor 106. In particular, container volume agent 152 is a tool that allows VM 104 to communicate I/O requests to hypervisor 106 on behalf of containers 130, and more specifically on behalf of applications 132 running in container 130 on VM 104. For example, an I/O request issued by an application 132 running in a container 130 on VM 104 to a storage virtual disk 144 backed by a storage virtual disk file 145 stored in storage 122 may be intercepted by container volume agent 152, and container volume agent 152 may forward this request to hypervisor 106 such that the request can be serviced.

In certain embodiments, guest OS 138 includes a native file system layer that interfaces with virtual hardware platform 140 to access, from the perspective of each application 132 (and guest OS 138), a data storage host bus adapter (HBA), which in reality, is virtual HBA 142 implemented by virtual hardware platform 140 that provides, to Guest OS 138, the functionality of disk storage support to enable execution of guest OS 138 as though guest OS 138 is executing on physical system hardware. In certain embodiments, a virtual disk exposes the same abstraction as a real (physical) disk, that is, a linear list of addressable sectors. However, a hypervisor may store images backing the storage virtual disks 144 as regular disk files shown in FIG. 1A as storage virtual disk file 145 stored on storage 122. From the perspective of each application 132 (and guest OS 138), file system calls are initiated by each application 132 to implement file system-related data transfer and control operations (e.g., read and/or write I/Os), such as to storage virtual disk 144. Such calls are translated by guest OS 138 into disk sector I/O requests that are passed through virtual HBA 142 to hypervisor 106. Hypervisor 106, then translates these requests into file access requests from cache and storage virtual disk files 161, 145. In the case that storage 122 is a centralized storage system such as a storage area network (SAN) device or system, the data transfer and control operations may be passed through various layers of hypervisor 106 to true hardware HBAs or network interface cards (NICs) 120 that connect to storage 122 as described in more detail below.

Storage 122 represents persistent storage devices (e.g., one or more hard disks, flash memory modules, solid state drives (SSDs), and/or optical disks). Although the example embodiment shown in FIG. 1A illustrates storage 122 as local storage in hardware platform 108, in some embodiments, storage 122 is storage externally coupled to host 102.

Storage 122 may store one or more storage virtual disks 145 corresponding to one or more storage virtual disks 144 that VMs 104 and containers 130 access. Each storage virtual disk 144 is a virtual storage for one or more containers 130 that has been manually provisioned, e.g., by an administrator, or dynamically or automatically provisioned. In certain embodiments, each storage and cache virtual disk 144, 160 is an abstraction (e.g., shown using dashed lines in virtual hardware platform 140 in FIG. 1A) backed by a file, such as a .vmdk or .vhd file or the like, containing a virtual disk image. For example, cache virtual disk files 161 and storage virtual disk files 145 backing cache virtual disks 160 and storage virtual disks 144, respectively, are shown stored in storage 122. In certain embodiments, each storage and cache virtual disk 144,160 has a lifecycle independent of any individual container 130 that uses the storage virtual disk 144. Accordingly, when all containers 130 associated with a storage virtual disk 144 and/or cache virtual disk 160 are removed from host 102 (e.g., all containers 130 are no longer running), storage/cache virtual disks 144, 160 may still exist.

Additionally, in certain embodiments, storage 122 includes one or more cache virtual disks 160. Similar to storage virtual disks 144, each cache virtual disk 160 is storage for one or more containers 130. However, cache virtual disks 160 may provide faster access to data than storage virtual disks 160, given cache virtual disks 160 are backed by virtual disk files stored on comparatively faster storage medium than the storage medium containing virtual disk files backing storage virtual disks 144.

Because high speed persistent storage devices can be relatively expensive, cache virtual disks 160 may be limited in size and therefore may only be able to cache a limited amount of data. Accordingly, each cache virtual disk 160 may implement a replacement policy, such as a least recently used (LRU) policy that defines eviction logic of the corresponding cache virtual disk 160. LRU is a cache eviction strategy, wherein if the cache size has reached the maximum allocated capacity, the least recently accessed objects in the cache will be evicted and overwritten when a new data object is to be written to the cache virtual disk.

One or more configuration files may specify whether storage virtual disks 144 and/or cache virtual disks 160 are to be created for use by containers 130. More specifically, the configuration files may contain a special field called "type" along with other properties of the virtual disks to be created. Where the "type" field value is set to "data," a storage virtual disk 144 is created. Alternatively, where a "type" field value is set to "cache," then a cache virtual disk 160 is created. Cache virtual disks 160 to be created for use by multiple storage virtual disks 144 (and, in some cases, multiple containers 130) may be indicated in one configuration file used to create one of the containers 130, and need not be included in all configuration files used to create all of the containers 130 which may share the cache virtual disk 160.

Hypervisor 106 includes a container proxy 110 and a storage layer 112. Storage layer 112 is configured to receive and understand disk block-based I/O requests from guest OS 138, received via virtual HBA 142, through container proxy 110. Container proxy 110 is configured to receive disk block-based operations for reading and/or writing data (e.g., for an application 132) to a storage virtual disk 144 and/or a cache virtual disk 160 and transferring such requests to storage layer 112. In certain embodiments, container proxy 110 is further configured to associate each created cache virtual disk 160 with at least one storage virtual disk 144 and one container 130. For example, when one or more storage virtual disks 144 are created for applications 132 running in containers 130, container proxy 110 may be responsible for associating the new storage virtual disk(s) 144 (and in some cases, new container(s) 130) with existing cache virtual disk(s) 160. Additionally, when one or more cache virtual disks 160 are created, container proxy 110 may be responsible for associating the new cache virtual disk(s) with one or more existing storage virtual disks 144 and their associated containers 130. There may be a one-to-one or one-to-many relationship between cache virtual disks 160 and storage virtual disks 144, such that each cache virtual disk 160 is associated with one or more storage virtual disks 144 of one or more containers 130. In certain aspects, storage virtual disks 144 of applications that are related (e.g., access similar data, belong to the same user, belong to the same tenant, etc.) may be associated with the same cache virtual disk 160 to increase the likelihood of cache hits across multiple applications 132. In certain aspects, containers 130 that are related, such as running applications that are related, may be associated with the same cache virtual disk 160 to increase the likelihood of cache hits across multiple containers 130. Container proxy 110 may be responsible for load balancing when making the association between storage virtual disks 144/containers 130 and cache virtual disks 160. Example load balancing performed by container proxy 110 is described below with reference to FIGS. 5 and 6.

Figure 1B:
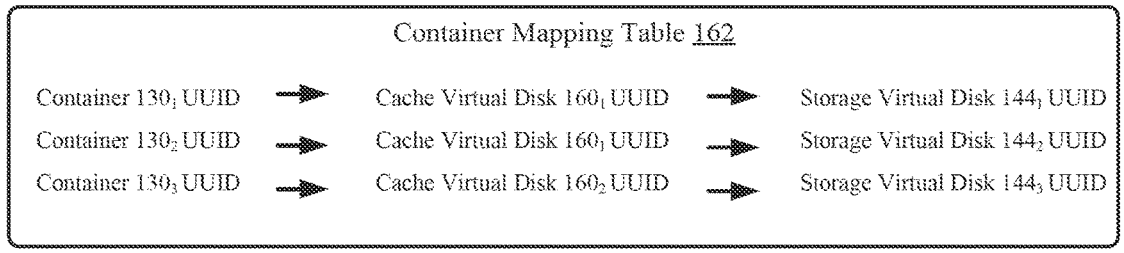
FIG. 1B depicts an example container mapping table maintained by a container proxy in the computing system of FIG. 1A, according to an example embodiment of the present application.

In certain embodiments, container proxy 110 is configured to maintain a container mapping table 162. Container mapping table 162 may include mappings of storage virtual disks and their associated cache virtual disks, as well as containers of applications associated with the storage virtual disks. For example, as illustrated in FIG. 1B, container mapping table 162 may contain mappings of container UUID, cache virtual disk UUID, and storage virtual disk UUID for each storage virtual disk 144 created for containerized applications 132 running on host 102. In FIG. 1A, three applications 132 are shown running in containers 130 on host 102. A single storage virtual disk 144 may be created and assigned to each of the three applications 132. Accordingly, three mappings, one for each storage virtual disk 144, are provided in container mapping table 162. In particular, a first mapping for storage virtual disk $144_1$ in container mapping table 162 is <Container $130_1$ UUID, Cache Virtual disk $160_1$ UUID, Storage Virtual Disk $144_1$>, where cache virtual disk $160_1$ UUID represents the UUID of cache virtual disk $160_1$ in storage 122. Similar mappings are provided for storage virtual disk $144_2$ and storage virtual disk $144_3$.

In certain embodiments, when container proxy 110 receives disk block-based I/O operations for reading and/or writing data, container proxy 110 determines which cache virtual disk 160 the data is to be written to based on the mappings maintained in the container mapping table 162. For example, an application 132 running in a container 130 on VM 104 may issue an I/O to write data to a particular storage virtual disk 144 (e.g., a storage virtual disk 144 associated with a container 130 where the application 132 is running). The I/O issued by application 132, containing a UUID of the particular storage virtual disk, may be intercepted by container volume agent 152. Container volume agent 152 may determine a container UUID associated with the I/O based on which container 130 the I/O originated from. Container volume agent 152 may provide this I/O and the determined container UUID to container proxy 110 on hypervisor 106 (e.g., via HBA 142). Based on the provided container UUID, the UUID of the particular storage virtual disk 144 indicated in the I/O, and the mapping maintained in the container mapping table 162, container proxy 110 may determine which cache virtual disk 160 the I/O data is to be written to. Container proxy 110 provides an indication of this identified cache virtual disk 160 to storage layer 112.

Storage layer 112 is configured to manage storage space for VMs 104. In one embodiment, storage layer 112 may include numerous logical layers, such as an I/O virtualization layer 182 a container volume driver 114, and a disk access layer 184. In some embodiments, I/O virtualization layer 182 receives a disk block-based I/O from storage layer 112 (in the form of commands, for example, intended for a storage virtual disk 144 and/or a cache virtual disk 160) and converts the I/O into disk block-based I/O operations that are understood by container volume driver 114. I/O virtualization layer 182 then issues these disk block-based I/O operations to the container volume driver 114. Container volume driver 114, in general, manages creation, use, and deletion of files (e.g., such as .vmdk files 161 and 145 backing storage virtual disks 144 and cache virtual disks 160) stored on physical locations of, or in logical volumes or Logical Unit Numbers (LUNs) exposed by, storage 122. Container volume driver 114 issues these disk block-based I/O operations to a data access layer 184 that applies command queuing and scheduling policies to the operations and ultimately sends the operations to components of physical hardware platform 108, and more specifically, storage 122 to read and/or write data to blocks stored in cache virtual disk file 161 and/or storage virtual disk file 145.

Figure 1C:
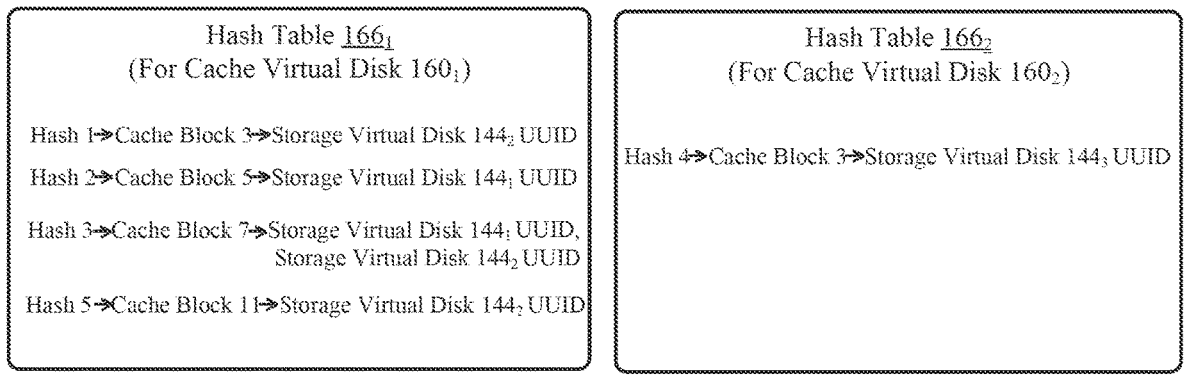
FIG. 1C depicts example logical block address (LBA) tables maintained by a container volume driver in the computing system of FIG. 1A, according to an example embodiment of the present application.

In certain embodiments, container volume driver 114 maintains one or more hash tables 166. Each hash table 166 may include mappings of hash, cache block, and storage virtual disk 144 UUID for each cache virtual disk 160. In particular, an entry for each data payload written to a storage virtual disk 144 and additionally to a cache block of a cache virtual disk 160 (e.g., associated with the storage virtual disk 144) may be added to a corresponding hash table 166 for the cache virtual disk 160. The entry may include a hash value computed for the data payload by container volume driver 114, a cache block address in cache virtual disk 160 where the data payload is written, and a UUID of the storage virtual disk 144 where the data payload is also written (e.g., a storage virtual disk 144 associated with the cache virtual disk 160). For example, as illustrated in FIG. 1C, a first hash table, hash table $166_1$ associated with cache virtual disk $160_1$ in FIG. 1A, may contain mappings of hash, cache block address, and storage virtual disk 144 UUID for each data payload written to cache virtual disk $160_1$. Example hash table $166_1$ includes four entries of <Hash, Cache Block Address, Storage Virtual Disk UUID>; thus, data may be written to four cache blocks in cache virtual disk $160_1$. The data written to four cache blocks in cache virtual disk $160_1$ may also be written in storage virtual disk $144_1$ and/or storage virtual disk $144_2$ given both of these storage virtual disks 144 are associated with cache virtual disk $160_1$. As described in detail below with respect to FIG. 4, container volume driver 114 may use hash tables 166, maintained by container volume driver 114, to determine whether a read I/O can be read from a cache virtual disk 160 or needs to be read from a storage virtual disk 144 (e.g., when the data is not stored in cache virtual disk 160).

Figure 1D:
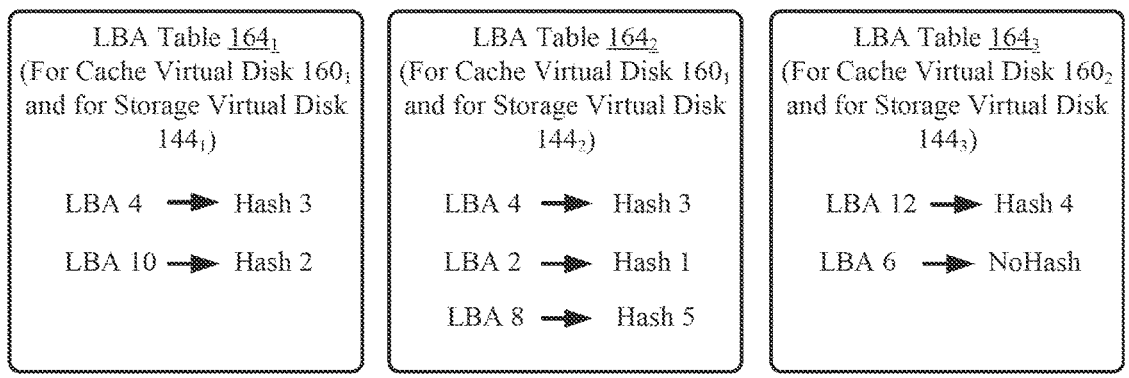
FIG. 1D depicts example hash tables maintained by the container volume driver in the computing system of FIG. 1A, according to an example embodiment of the present application.

In certain embodiments, container volume driver 114 maintains one or more logical block address (LBA) tables 164. Each LBA table 164 may correspond to a particular storage virtual disk 144. Each LBA table 164 may be associated with a hash table 166. In some cases, a single hash table 166 may be associated with multiple LBA tables 164. Each LBA table 164 may include mappings of LBAs and hashes for each storage virtual disk 144. In particular, an entry for each data payload written to a block in storage virtual disk 144 may be added to a corresponding LBA table 164 for the storage virtual disk 144. The entry may include an LBA of the data payload and a hash value computed for the data payload by container volume driver 114. For example, as illustrated in FIG. 1D, a first LBA table, LBA table $164_1$, associated with storage virtual disk $144_1$ in FIG. 1A, may contain mappings of LBA and hash for each data payload written to storage virtual disk $144_1$. Example LBA table $164_1$ includes two entries of <LBA, Hash>; thus, data may be written to two blocks in storage virtual disk $144_1$. As described in detail below with respect to FIG. 4, container volume driver 114 may use LBA tables 164 maintained by container volume driver 114, to determine whether a read I/O can be read from a cache virtual disk 160 or needs to be read from a storage virtual disk 144 (e.g., when the data is not stored in cache virtual disk 160).

Container mapping table 162, hash tables 166, and LBA tables 164 illustrated in FIGS. 1B, 1C, and 1D, respectively, are described in more detail below with reference to FIGS. 2A and 2B, FIGS. 3A and 3B, and FIG. 4.

Hardware platform 108 of each host 102 includes components of a computing device such as one or more processors (central processing units (CPUs)) 118, memory 116, a network interface card including one or more network adapters, also referred to as NICs 120, storage 122, HBA 124, and other I/O devices such as, for example, a mouse and keyboard (not shown). CPU 118 is configured to execute instructions, for example, executable instructions that perform one or more operations described herein and that may be stored in memory 116 and in storage 122. NIC 120 enables host 102 to communicate with other devices via a communication medium. HBA 124 couples host 102 to one or more external storages (not shown), such as a storage area network (SAN).

To allow for use of cache virtual disk(s) 160 and/or storage virtual disk(s) 144 by container(s) 130, cache virtual disk(s) 160, and storage virtual disk(s) 144 are first created and deployed in host 102.

Figure 2A:
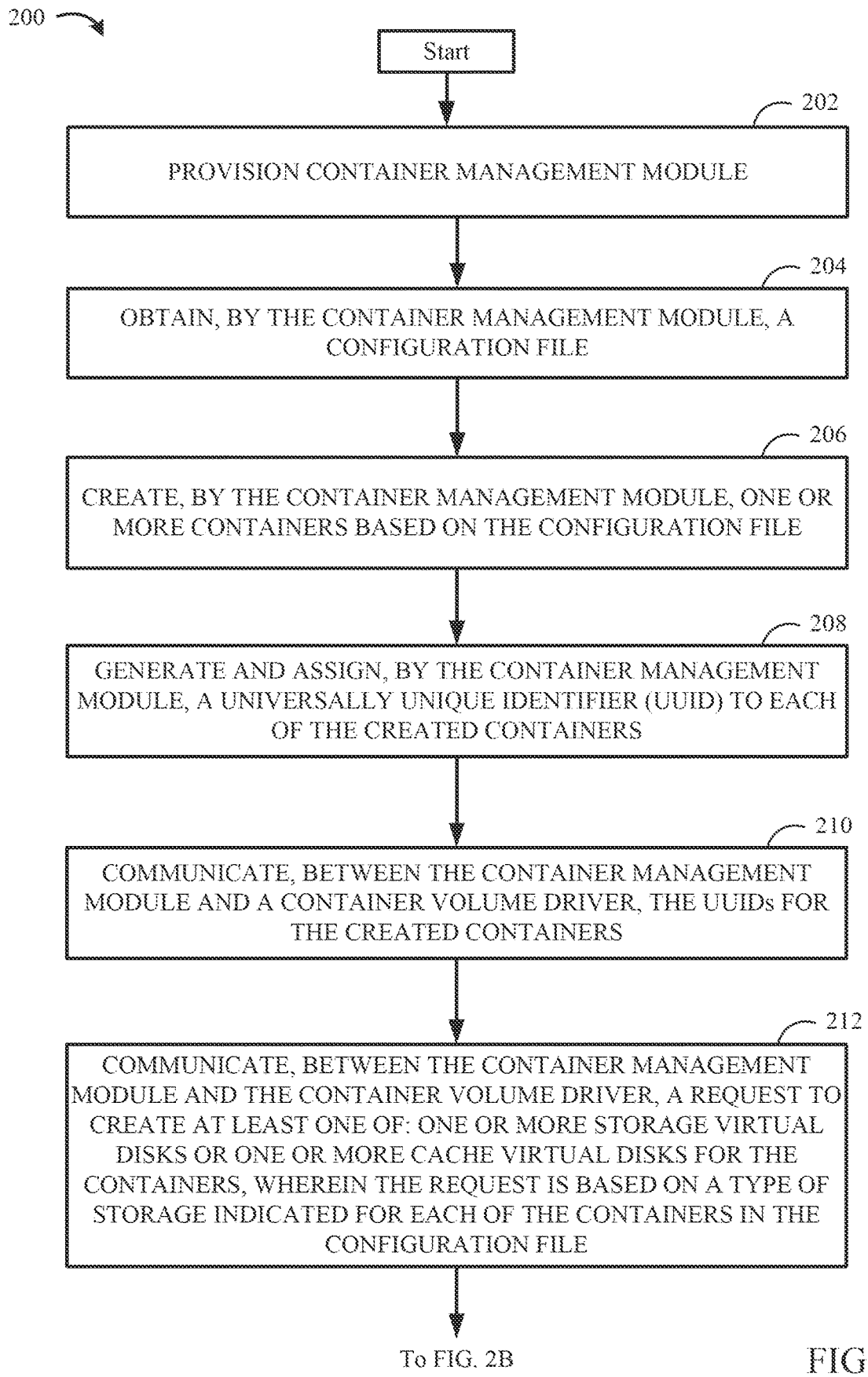
FIGS. 2A and 2B depict an example workflow for creating one or more containers and their associated storage, according to an example embodiment of the present application.
Figure 2B:
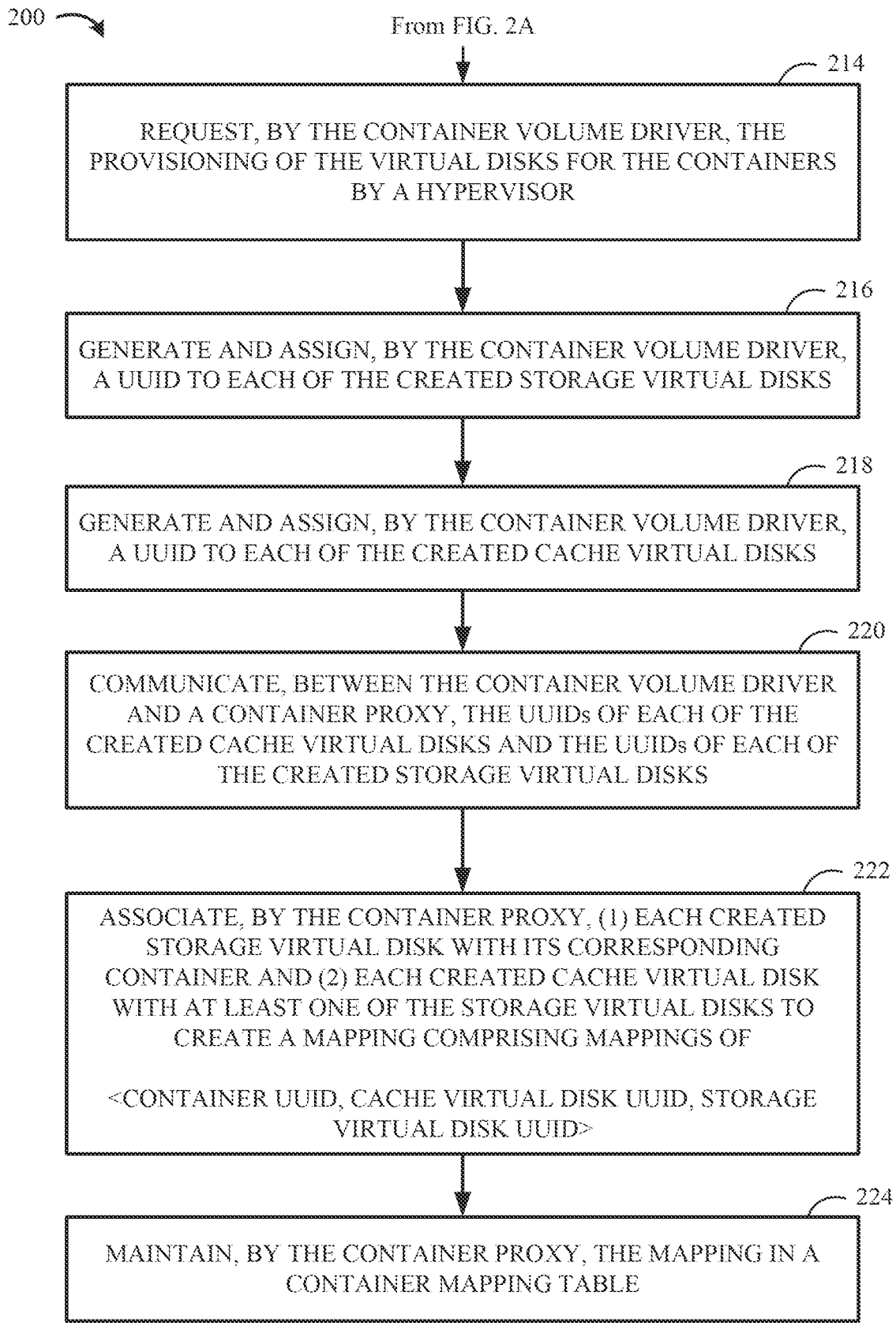
Figure 3A:
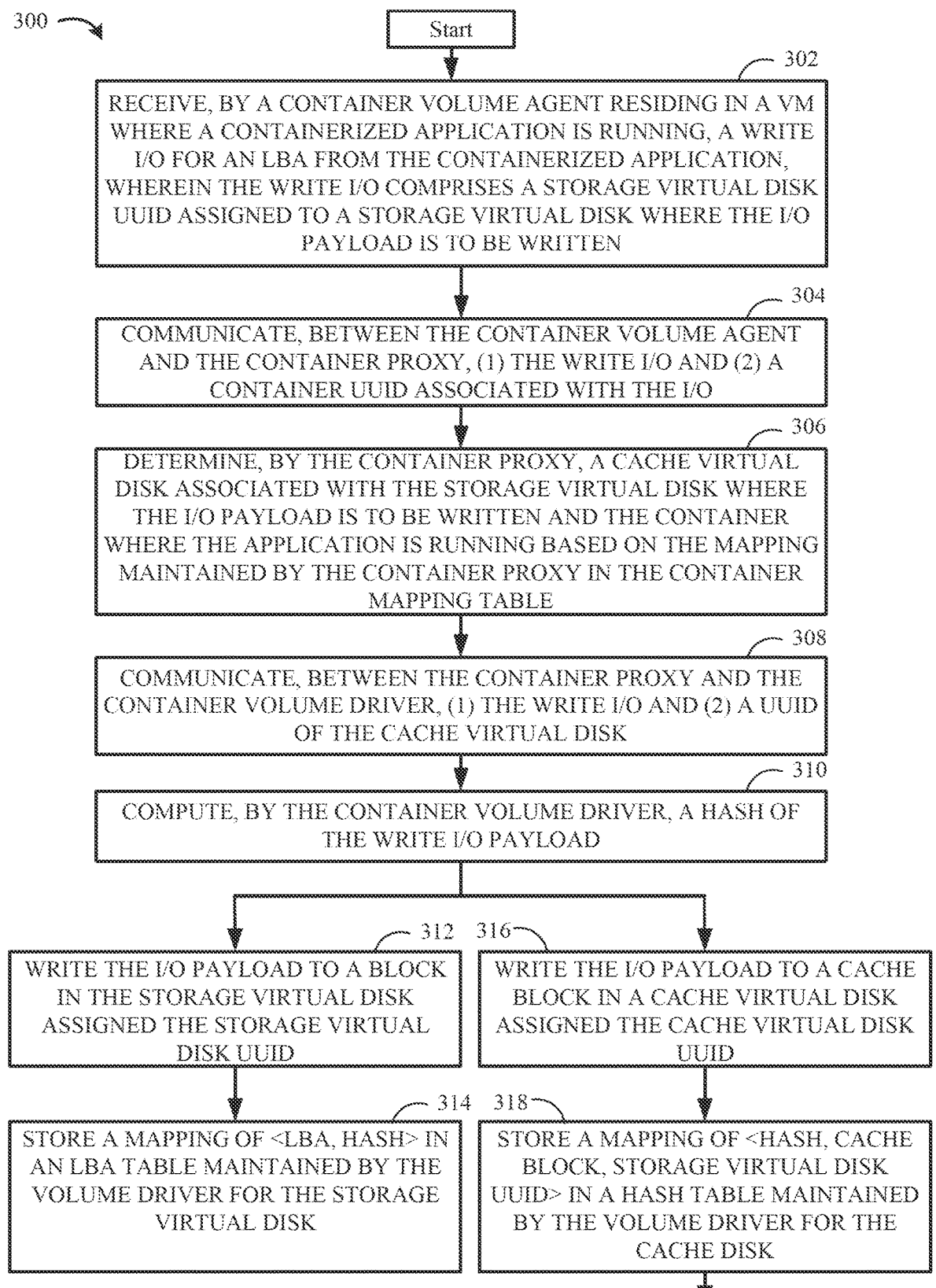
FIGS. 3A and 3B depict an example workflow for processing a write request from a containerized application, according to an example embodiment of the present application.
Figure 3B:
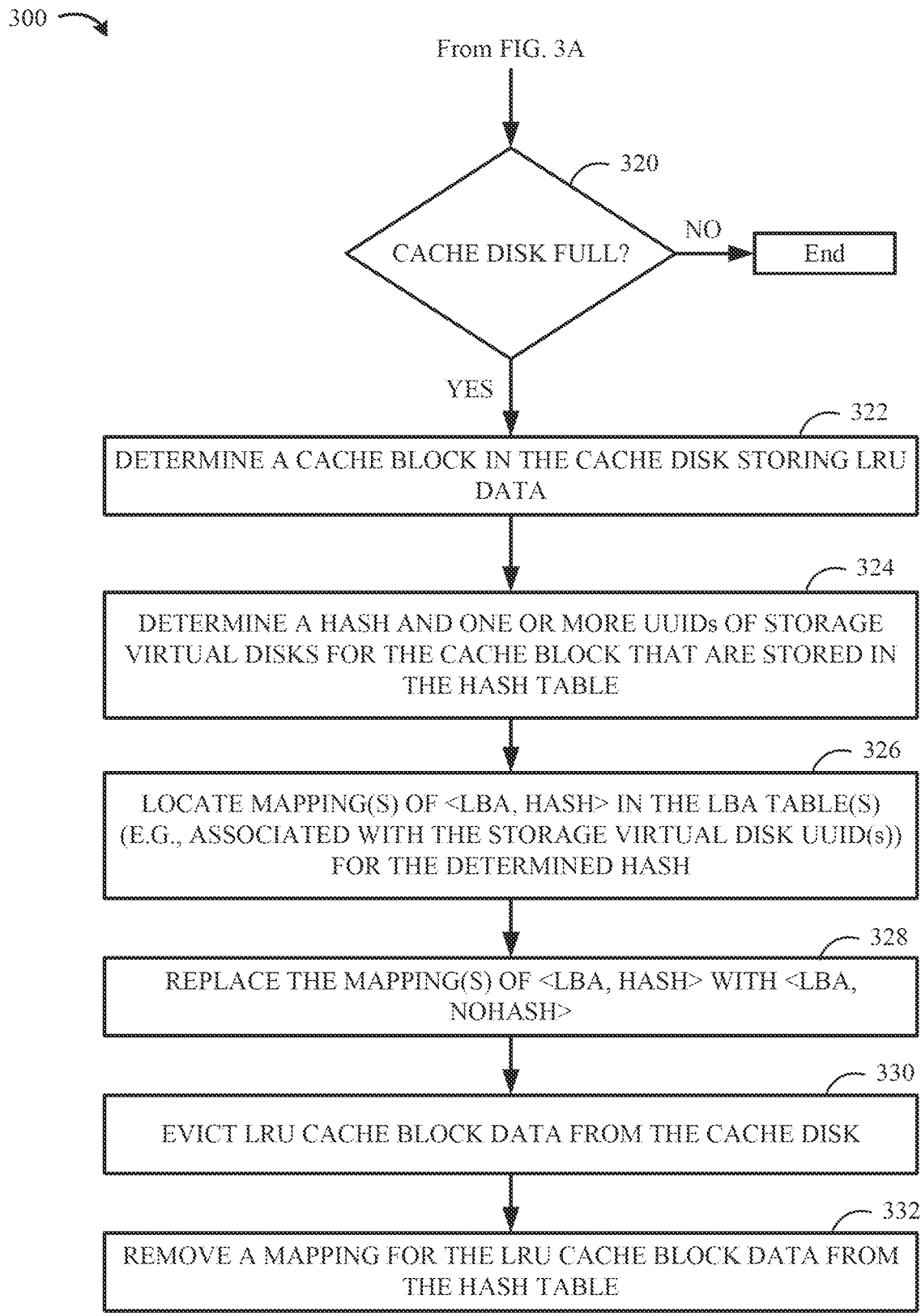

FIGS. 2A and 2B depict an example workflow 200 for creating one or more containers 130 and their associated storage based on information defined in a configuration file for the containers 130. The configuration file may be made up of one or more manifests that declare intended infrastructure (e.g., pods, containers, etc.) and applications 132 to be deployed on host 102. The manifests may be JavaScript Object Notation (JSON) files, YAML files, etc., that indicate a number of containers 130, a number of cache virtual disks 160, and/or a number of storage virtual disks 144 to create and deploy on host 102. As described in more detail below, container management module 150 may use this information contained in the configuration file to create and deploy containers 130. Further, container volume driver 114 may use this information contained in the configuration file to request that hypervisor 106 create and deploy one or more cache virtual disks 160 and/or one or more storage virtual disks 144. As such, workflow 200 of FIGS. 2A and 2B may be performed, for example, by at least container management module 150, container volume driver 114, and hypervisor 106, as well as container volume agent 152 and container proxy 110 illustrated in FIG. 1A.

Workflow 200 begins, at operation 202, by provisioning container management module 150 in VM 104 on host 102. At operation 204, container management module 150 obtains a configuration file (not shown) comprising one or more manifests that define the configuration of one or more containers 130, and their associated storage, which are to be deployed on host 102, as described above. The configuration file may be stored locally or accessed from a remote server according to a request to process the configuration file received from an administrator, orchestrator, or a programmed or configured default configuration file location. At operation 206, container management module 150 creates one or more containers 130 based on the configuration file. For purpose of illustration, it may be assumed that the configuration file indicates that three containers 130 are to be created, and more specifically, container $130_1$, container $130_2$, and container $130_3$ illustrated in FIG. 1A.

At operation 208, a UUID is assigned to each of the created containers 130 to uniquely identify each container 130 created by container management module 150. The UUIDs may be generated and assigned by container management module 150. At operation 210, container management module 150 communicates the UUIDs of the created containers 130 to container volume driver 114 in hypervisor 106. For example, UUIDs of container $130_1$, container $130_2$, and container $130_3$ are communicated to container volume agent 152, which then communicates this information to container proxy 110, which then further communicates this information to container volume driver 114.

In addition to the UUIDs of container 130, at operation 212, container management module 150 communicates to container volume driver 114 (e.g., through container volume agent 152 and container proxy 110) a request to create storage for containers 130. The request may indicate one or more storage virtual disks 144 and/or cache virtual disks 160 that are to be created and then assigned to one or more of containers 130. The number of storage virtual disks 144 and/or cache virtual disks 160 indicated in the request may be based on a number of storage virtual disks 144 and/or cache virtual disks 160 indicated in the configuration file. In some cases, the request indicates which container 130 each of the storage virtual disks 144 are to be created for and assigned to. In some cases, the request indicates more than one storage virtual disk 144 is to be created for a single container 130.

At operation 214 (as shown in FIG. 2B), container volume driver 114, requests that hypervisor 106 provision the virtual disks (e.g., one or more storage virtual disks 144 and/or one or more cache virtual disks 160), for containers 130. Hypervisor 106 creates each of the requested storage virtual disks 144 and/or cache virtual disks 160 based on the request. For example, hypervisor 106 may be requested to create two cache virtual disks (e.g., cache virtual disk $160_1$ and cache virtual disk $160_2$) and three storage virtual disks (e.g., storage virtual disk $144_1$, storage virtual disk $144_2$, and storage virtual disk $144_3$). Cache virtual disk $160_1$ and cache virtual disk $160_2$ may be created for shared use by one or more of container $130_1$, container $130_2$, and container $130_3$ illustrated in FIG. 1A. Further, storage virtual disk $144_1$ may be created and assigned for use by container $130_1$, storage virtual disk $144_2$ may be created and assigned for use by container $130_2$, and storage virtual disk $144_3$ may be created and assigned for use by container $130_3$ illustrated in FIG. 1A.

At operation 216, container volume driver 114 generates and assigns a UUID to each of the created storage virtual disks 144. Additionally, at operation 218, container volume driver 114 generates and assigns a UUID to each of the created cache virtual disks 144. At operation 220, container volume driver 114 communicates (1) the UUIDs of the created cache virtual disks 160 and (2) the UUIDs of the created storage virtual disks 144 to container proxy 110 in hypervisor 106.

At operation 222, container proxy 110 associates each created storage virtual disk 144 with its corresponding container 130 (e.g., based on information defined in configuration files for the containers 130). Further, at operation 222, container proxy 110 associates each created cache virtual disk 160 with at least one of the storage virtual disks 144. Associating a cache virtual disk 160 with a storage virtual disk 144 may also create an association between cache virtual disk(s) 160 and containers 130 (e.g., which are assigned the storage virtual disks 144). Based on the created associations, container proxy 110 may create a mapping comprising mappings of <Container UUID, Cache Virtual Disk UUID, Storage Virtual Disk UUID>. For example, at operation 222, container proxy 110 may associate container $130_1$ with storage virtual disk $144_1$, associate container $130_2$ with storage virtual disk $144_2$, and associate container $130_3$ with storage virtual disk $144_3$. Additionally, container proxy 110 may associate storage virtual disk $144_1$ and storage virtual disk $144_2$ (e.g., assigned to containers $130_1$ and $130_2$, respectively) with cache virtual disk $160_1$ and associate storage virtual disk $144_3$ (e.g., assigned to container $130_3$) with cache virtual disk $160_3$. As such, containers $130_1$ and $130_2$ may use cache virtual disk $160_1$ for I/O reads and/or writes, while container $130_3$ may use cache virtual disk $160_2$ for I/O reads and/or writes.

Container proxy 110 distributes storage virtual disks 144, of containers 130, to cache virtual disks 160 for purposes of load balancing and scalability. For example, a cache virtual disk 160 may have a limited size, which may limit how much data can be cache for a set of containers 130. The limited size may mean that data is evicted from the cache more quickly if storage virtual disks 144 of a larger number of containers 130 share a cache, thereby decreasing the chance of a cache hit. Therefore, distributing storage virtual disks 144 of containers 130 to lessen the chance that a single cache virtual disk 160 is assigned too many storage virtual disks 144/containers 130 may be beneficial.

In addition to associating containers $130_1$, $130_2$, and $130_3$ with cache virtual disks $160_1$ and $160_2$ and storage virtual disks $144_1$, $144_2$, and $144_3$, container proxy 110 also generates three mapping table entries of <Container $130_1$ UUID, Cache Virtual Disk $160_1$ UUID, Storage Virtual Disk $144_1$>, <Container $130_2$ UUID, Cache Virtual Disk $160_1$ UUID, Storage Virtual Disk $144_2$>, and <Container $130_3$ UUID, Cache Virtual Disk $160_1$ UUID, Storage Virtual Disk $144_3$>. Each of these mappings may be added to a container mapping table 162 that is maintained by container proxy 110, as shown at operation 224. These example mappings are illustrated in the example container mapping table 162 of FIG. 1B.

Applications 132 may be deployed in the one or more containers 130 created at operation 206 of FIG. 2A. At least one of these applications 132 may request to write data to storage, which in this case is a storage virtual disk. For example, the application 132 may issue a write I/O to write data to a particular storage virtual disk 144 (e.g., a storage virtual disk 144 associated with a container 130 where the application 132 is running). The write I/O may contain a UUID of the particular storage virtual disk, a starting offset (or LBA) indicating where the data is to be written within the storage virtual disk 144, and a length of the I/O. This information may be passed through one or more components illustrated in FIG. 1A such that the data payload is written to storage virtual disk 144, meaning, as discussed, storage virtual disk file 145 stored on storage 122. Further, the data may also be written to a cache virtual disk 160 associated with the storage virtual disk 144 and a container 130 where the application 132, issuing the write I/O, is running. Additional details for processing the write request from the containerized application 132 are provided in example workflow 300 illustrated in FIGS. 3A and 3B.

Workflow 300 begins, at operation 302, by container volume agent 152 residing in VM 104 receiving a write I/O for an LBA from a containerized application 132 running in VM 104. The write I/O may include a storage virtual disk UUID assigned to a storage virtual disk where the I/O payload is requested to be written. For example, the write I/O received by container volume agent 152, from application 132 running in container $130_1$, may include a UUID of storage virtual disk $144_1$ when the request is to write data to storage virtual disk $144_1$ assigned to container $130_1$, as illustrated in FIG. 1A. Further, the write I/O may include an LBA associated with the data payload to be written and a length of the I/O. Container volume agent 152 may determine a container UUID associated with the I/O as the UUID of container $130_1$ given this is the container 130 where the I/O originated from.

At operation 304, container volume agent 152 communicates the write I/O (including all the identified information above) and the container UUID associated with the I/O to container proxy 110 in hypervisor 106 (e.g., via virtual HBA 142 illustrated in FIG. 1A). At operation 306, container proxy 110, determines a cache virtual disk 160 associated with storage virtual disk $144_1$ and container $130_1$ (e.g., where application 132 is running) based on mapping maintained by container proxy 110 in container mapping table 162. For example, container proxy 110 may use <Storage Virtual Disk $144_1$ UUID> and <Container $130_1$ UUID> to search container mapping table 162 and locate the entry <Container $130_1$ UUID, Cache Virtual Disk $160_1$ UUID, Storage Virtual Disk $144_1$ UUID> in container mapping table 162 and thereby determine that cache virtual disk $160_1$ is associated with storage virtual disk $144_1$ and container $130_1$.

At operation 308, container proxy 110 communicates (1) the write I/O and (2) the UUID of cache virtual disk $160_1$ to container volume driver 114 (e.g., determined at operation 306). At operation 310, container volume driver 114 calculates a hash value of the write I/O payload. A cryptographic hash function, such as SHA-1, may be used to calculate the hash value. Container volume driver 114 then writes the I/O payload to both a storage virtual disk 144 corresponding to the storage virtual disk 144 UUID contained in the write I/O and the cache virtual disk 160 corresponding to the cache virtual disk 160 UUID determined at operation 306.

In particular, at operation 312, the I/O payload is written to a block in the storage virtual disk 144 assigned the storage virtual disk 144 UUID. Further, at operation 314, container volume driver 114 stores a mapping of <LBA, Hash> in an LBA table 164 associated with the storage virtual disk 144 where the data is written. For example, where the write I/O indicates a write for LBA 4 and the hash of the I/O payload is calculated to be hash 3, the mapping added to LBA table 164 includes <LBA 4, Hash 3> (e.g., as shown as the first entry in LBA table $164_1$ in FIG. 1D).

Additionally, at operation 316, the I/O payload is written to a cache block (e.g., addressed/identified by a PBA of the cache virtual disk 160) in the cache virtual disk 144 (e.g., assigned the cache virtual disk 160 UUID determined at operation 306). Further, at operation 318, container volume driver 114 stores a mapping of <Hash, Cache Block, Storage Virtual Disk 144 UUID> in a hash table 166 associated with the cache virtual disk 160 where the data is written. For example, where the write I/O payload is written to cache block 7 in cache virtual disk 160 and the hash of the I/O payload is calculated to be hash 3 (e.g., similar to above), the mapping adding to hash table 166 comprises <Hash 3, Cache Block 7, Storage Virtual Disk $144_1$ UUID> (e.g., as shown as the third entry in hash table $166_1$ in FIG. 1C).

As mentioned above, cache virtual disk 160 may be limited in size and therefore may only be able to cache a limited amount of data. Thus, in some cases, when the I/O payload is written to cache virtual disk 160 at operation 314, cache virtual disk 160 may be full. As such, data may be evicted from cache virtual disk 160 based on one or more eviction policies defined for cache virtual disk 160. The eviction policy defined for cache virtual disk 160 is an LRU policy which evicts least recently used data from cache virtual disk 160 when the cache is full and new data is to be written to cache virtual disk 160.

Accordingly, assuming an LRU policy is defined for cache virtual disk 160, at operation 320 (e.g., illustrated in FIG. 3B), workflow 300 proceeds with determining whether cache virtual disk 160 is full. Where cache virtual disk 160 is not full, no data needs to be evicted from the cache and workflow 300 is complete. On the other hand, however, where at operation 320, cache virtual disk 160 is determined to be full, at operation 322, workflow 300 proceeds with determining a cache block in cache virtual disk 160 storing LRU data.

At operation 324, a hash and one or more UUIDs of storage virtual disks 144 for this identified LRU cache block, stored in a hash table 166 associated with the cache virtual disk 160, are determined. In particular, the hash and the UUID(s) of the storage virtual disk(s) 144 are determined by locating an entry of <Hash, Cache Block Address, Storage Virtual Disk 144 UUID(s)> in hash table 166 that has a cache block address equal to the cache block address storing the LRU data.

At operation 326, the hash value determined at operation 324 is used to locate a key-value pair of <LBA, Hash> that has a matching hash value stored in LBA table(s) 164 associated with the storage virtual disk 144 UUID(s) determined at operation 324. For example, where two storage virtual disk 144 UUIDs are included in the entry in hash table 166, two key-value pairs of <LBA, Hash> that have a matching hash may be located (e.g., one key-value pair per LBA table).

At operation 328, the hash value in the located key-value pair(s) may be replaced with "NoHash" such that the key-value pair(s) reads <LBA, NoHash>. As described in detail below with respect to FIG. 4, a mapping with "NoHash" may indicate to container volume driver 114 that a write for the identified LBA in the key-value pair <LBA, NoHash> has been removed from cache virtual disk 160 and thus needs to be serviced from a storage virtual disk 144 instead of cache virtual disk 160.

At operation 330, the LRU cache block data is evicted from cache virtual disk 160. Further, at operation 332, a mapping for the LRU cache block data (e.g., <Hash, Cache Block Address, Storage Virtual Disk 144 UUID(s)>) is removed from a hash table 166 associated with the cache virtual disk 160. Workflow 300 for servicing a write I/O from a containerized application 132 may be complete after operation 330. Accordingly, at the end of workflow 300, data requested to be written to a particular storage virtual disk 144 may be written to both the storage virtual disk 144 and a cache virtual disk 160 assigned to a container 130 where the containerized application 132, which issued the write I/O, is running.

Figure 4:
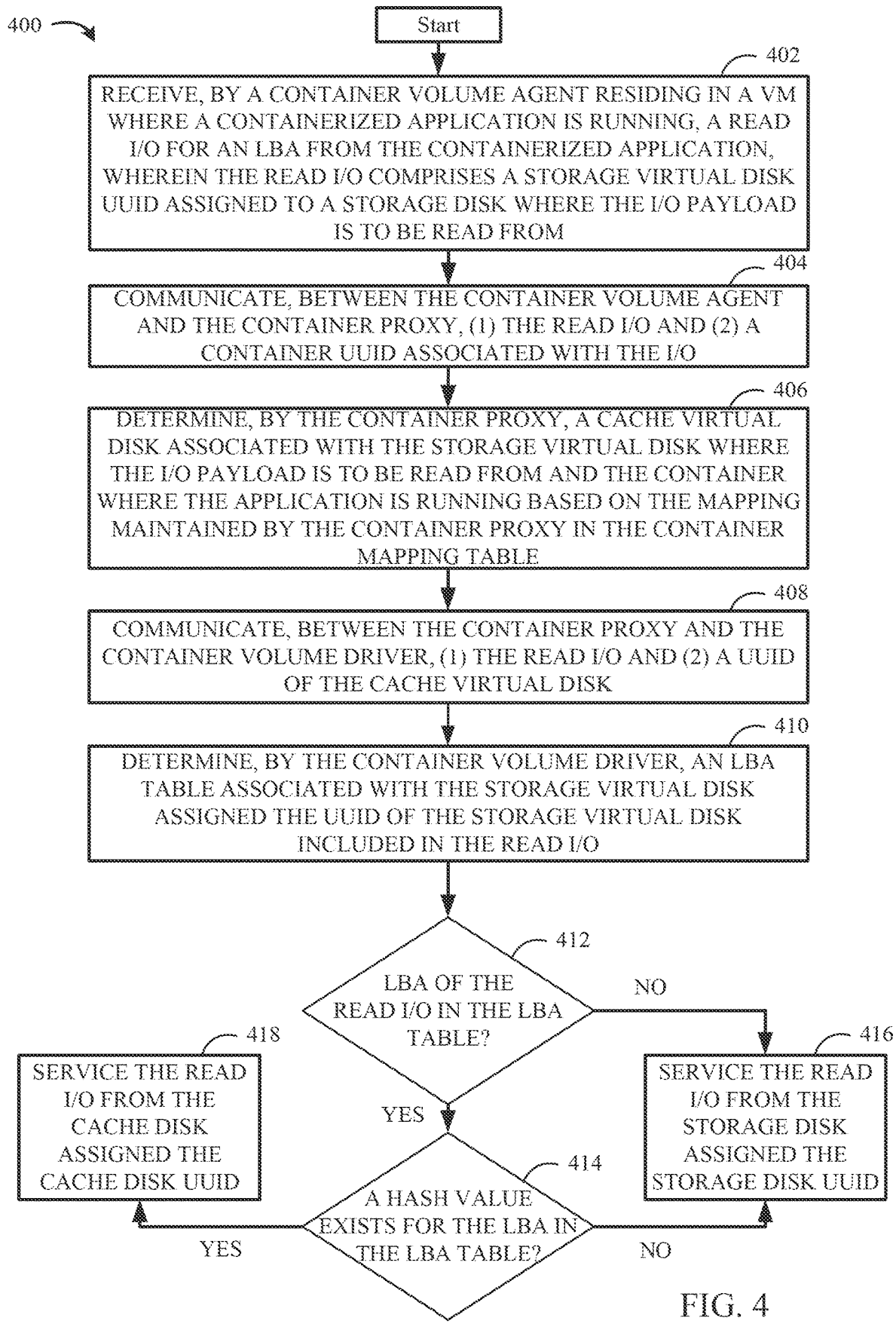
FIG. 4 depicts an example workflow for processing a read request from a containerized application, according to an example embodiment of the present application.

Data previously written to a storage virtual disk 144 and a cache virtual disk 160 may be requested by a containerized application 132. For example, the application 132 may issue a read I/O to read data previously stored written to a storage virtual disk 144. FIG. 4 depicts an example workflow 400 for processing the read request from the containerized application 132, according to an example embodiment of the present application.

Workflow 400 begins, at operation 402, by container volume agent 152 (e.g., illustrated in FIG. 1A) residing in VM 104 receiving a read I/O for an LBA from a containerized application 132 running in VM 104. The read I/O may include a storage virtual disk UUID assigned to a storage virtual disk 144 where the I/O payload is requested to be read from. For example, the read I/O received by container volume agent 152 (e.g., from application 132 running in container $130_1$) may include a UUID of storage virtual disk $144_1$ when the request is to read data from storage virtual disk $144_1$ assigned to container $130_1$, as illustrated in FIG. 1A. Container volume agent 152 may determine a container UUID associated with the I/O based on which container 130 the I/O originated from.

At operation 404, container volume agent 152 communicates the read I/O (including all the identified information above) and the container UUID associated with the I/O to container proxy 110 in hypervisor 106. At operation 406, container proxy 110, determines a cache virtual disk 160 associated with storage virtual disk $144_1$ and container $130_1$ (e.g., where application 132 is running) based on mapping maintained by container proxy 110 in container mapping table 162. For example, container proxy 110 may use storage virtual disk $144_1$ and <Container $130_1$ UUID> to search container mapping table 162 and locate the entry <Container $130_1$ UUID, Cache Virtual Disk $160_1$ UUID, Storage Virtual Disk $144_1$ UUID> in container mapping table 162 and thereby determine that cache virtual disk $160_1$ is associated with storage virtual disk $144_1$ and container $130_1$.

At operation 408, container proxy 110 communicates (1) the read I/O and (2) the UUID of cache virtual disk $160_1$ to container volume driver 114 (e.g., determined at operation 406). At operation 410, container volume driver 114 determines an LBA table 164 associated with the storage virtual disk 144 associated with the storage virtual disk UUID indicated in the read I/O. At operation 412, container volume driver 114 determines whether the LBA indicated in the read I/O is included in an entry in the identified LBA table 164. For example, container volume driver 114 may use the indicated <LBA> as a key to locate a key-value pair <LBA, Hash> with a matching LBA in LBA table 164, should an entry exist in LBA table 164 with this LBA.

As described previously with respect to FIGS. 3A and 3B, an entry (e.g., key-value pair of <LBA, Hash>) is added to an LBA table 164 when data is requested to be written to storage virtual disk 144 and is written to both storage virtual disk 144 and cache virtual disk 160. Thus, when the LBA is not found in LBA table 164 at operation 412, then the LBA is for data that was not previously written to a cache virtual disk 160. As such, at operation 416, the read I/O may be serviced from the storage virtual disk 144 assigned the storage virtual disk 144 UUID indicated in the read I/O. Although this data may not have been previously written to the storage virtual disk 144 and cache virtual disk 160 according to workflow 300 of FIGS. 3A and 3B, this data may have been added to storage virtual disk 144 previously by another process.

Alternatively, when the LBA is found in LBA table 164 at operation 412, then the LBA is for data that was previously written to a cache virtual disk 160. As such, at operation 414, container volume driver 114 determines whether a hash value exists for the LBA in the LBA table 164. More specifically, container volume driver 114 determines whether the key-value pair, <LBA, Hash> in LBA table 164, contains a value for the "Hash" or "NoHash." As described with respect to FIG. 3B, data may be evicted from a cache virtual disk based on an LRU policy defined for the cache. When data is evicted, a corresponding entry in an LBA table 164 may be removed and replaced with "NoHash" indicating that the data has been removed from the cache.

Thus, in cases where a hash value is determined, at operation 414, to exist for the LBA in LBA table 164, then the data for the LBA has not been evicted from the cache. Accordingly, at operation 418, the read I/O may be serviced from the cache virtual disk 160 assigned the cache virtual disk 160 UUID determined at operation 408.

In some other cases where a hash value is determined, at operation 414, not to exist for the LBA in LBA table 164, then the data for the LBA has been previously evicted from the cache. Accordingly, at operation 416, the read I/O may be serviced from the storage virtual disk 144 assigned the storage virtual disk 144 UUID indicated in the read I/O.

Workflow 400 for servicing a read I/O from a containerized application 132 may be complete after operation 418 or operation 416. Accordingly, at the end of workflow 400, data requested to be read from a particular storage virtual disk 144 may be read from either a storage virtual disk 144 with a UUID matching the UUID indicated in the read I/O or a cache virtual disk 160 assigned to the storage virtual disk 144 and a container 130 where the containerized application 132, which issued the read I/O, is running.

As mentioned herein, having a centralized caching scheme allows for scalability of both applications 132 and cache virtual disks 160. As such, in some cases, a user may remove and/or add a container 130 and its associated storage virtual disks 144. In some other cases, a user may remove and/or add a cache virtual disk 160. In some other cases, both may occur. In either case, container proxy 110 may be responsible for redistributing storage virtual disks 144 of containers 130 to available cache virtual disks 160 such that I/O requests from applications 132 in containers 130 are evenly distributed between the available cache virtual disks 160 such that no cache virtual disk 160 is overloaded with requests.

Figure 5A:
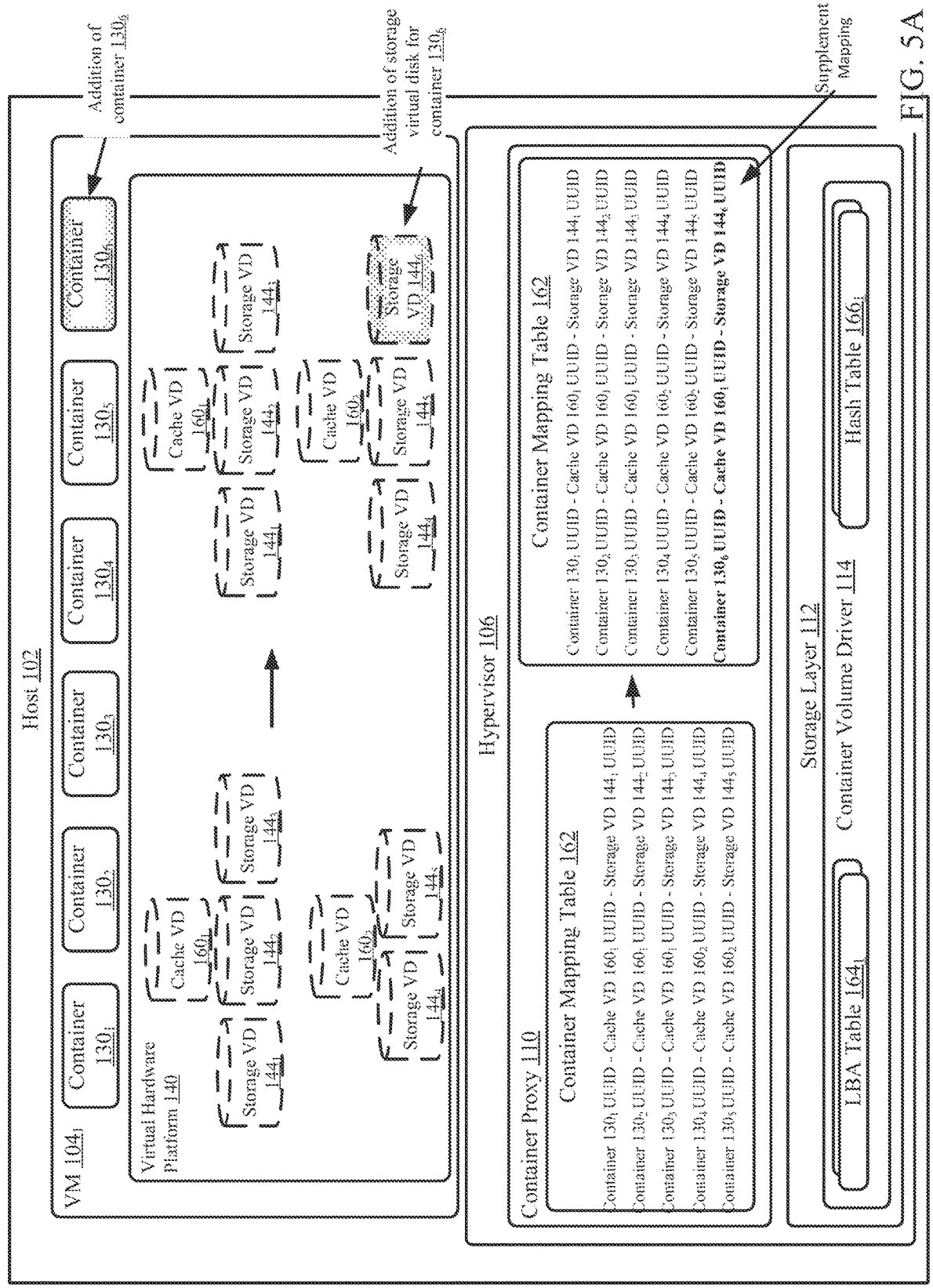
FIGS. 5A-5B depict example load balancing when a new container is introduced in a cluster, according to an example embodiment of the present application.
Figure 5B:
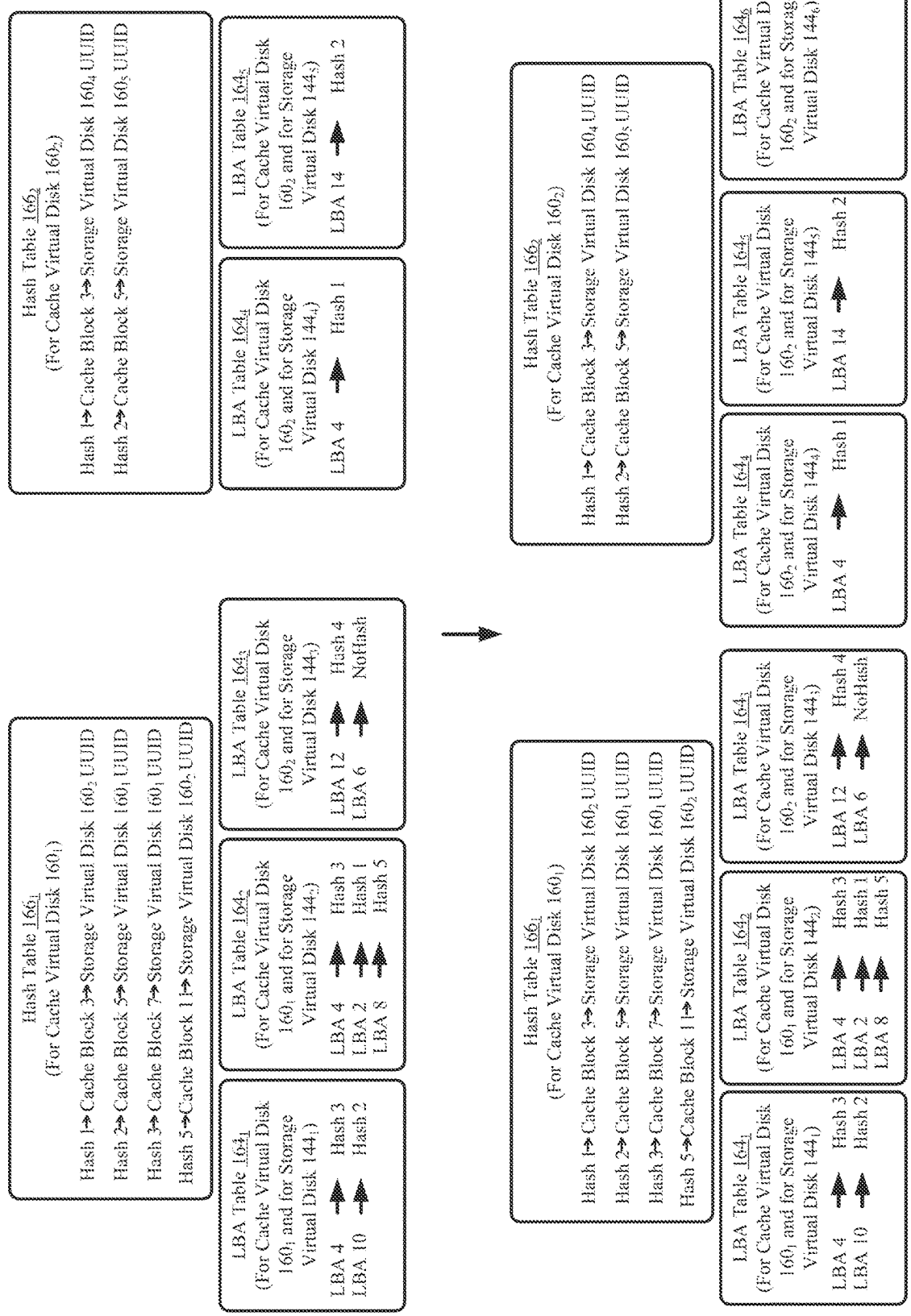

As an illustrative example, FIGS. 5A-5B depict such load balancing when a new container 130, and its associated storage virtual disk 144, is introduced in a cluster of hosts 102, according to an example embodiment of the present application. As shown in FIG. 5A, containers $130_{1-5}$, storage virtual disks $144_{1-5}$, and cache virtual disks $160_{1-2}$ currently exist on host 102. Accordingly, mapping maintained by container proxy 110 (e.g., in container mapping table 162) contains an entry for each container $130_{1-5}$ and its assigned cache virtual disk 160 and storage virtual disk 144. For example, an entry for container $130_1$, an entry for container $130_2$, and an entry for container $130_3$ indicates that these containers are assigned to cache virtual disk $160_1$, while an entry for container $130_4$ and an entry for container $130_5$ indicates that these containers are assigned to cache virtual disk $160_2$. Further, each container $130_{1-5}$ may be assigned its own storage virtual disk 144 (e.g., not shared with other containers 130); thus, the entry for each container $130_{1-5}$ may additionally include the UUID of the storage virtual disk 144 that is assigned to the corresponding container.

At a later time, a user may add container $130_6$ to VM $104_1$ on host 102, as well as a storage virtual disk $144_6$ assigned to new container $130_6$ for storing data. The addition of this container and storage virtual disk may require container proxy 110 to supplement the mapping currently maintained in container mapping table 162. For example, container proxy 110 may add a sixth entry to the container mapping table 162 identifying the storage virtual disk 144 created for container $130_6$ and a cache virtual disk 160 assigned to storage virtual disk 144 created for container $130_6$. In this example, container proxy 110 may assign cache virtual disk $160_2$ to new storage virtual disk $144_6$ such that the storage virtual disks 144, and their corresponding containers 130, are evenly distributed across the available cache virtual disks 160 (e.g., three storage virtual disks 144 of three containers 130 are assigned to cache virtual disk $160_1$ and three storage virtual disks 144 of containers 130 are assigned to cache virtual disk $160_2$).

In addition to supplementing the mapping maintained in container mapping table 162, a new LBA table $164_6$ may be added for storage virtual disk $144_6$ created for new container $130_6$. Addition of the new LBA table 164 is illustrated in FIG. 5B. New LBA table 164, for storage virtual disk $144_6$, may be associated with hash table $166_2$ given storage virtual disk $144_6$ is associated with cache virtual disk $160_2$ (e.g., assigned hash table $166_2$).

Similar load balancing may also occur when a container 130, and its associated storage virtual disk(s) 144, is removed from host 102 within the cluster, such that available storage virtual disks 144, after the storage virtual disk(s) is removed, are evenly distributed across the available cache virtual disks 160. Further, when a container 130 is removed, instead of supplementing container mapping table 162, an entry for the removed container 130 may be removed from container mapping table 162. Additionally, an LBA table(s) associated with the removed storage virtual disk(s) 144 may also be removed.

In some cases, as part of the removal operation of a container 130, storage virtual disk(s) 144 associated with the container 130 may not be removed. In particular, these storage virtual disk(s) 144 may become dangling volume(s). In such cases, the dangling volume(s) may not be associated with/mapped to any cache virtual disk 160 as they there is no container 130 using the dangling volume.

Figure 6A:
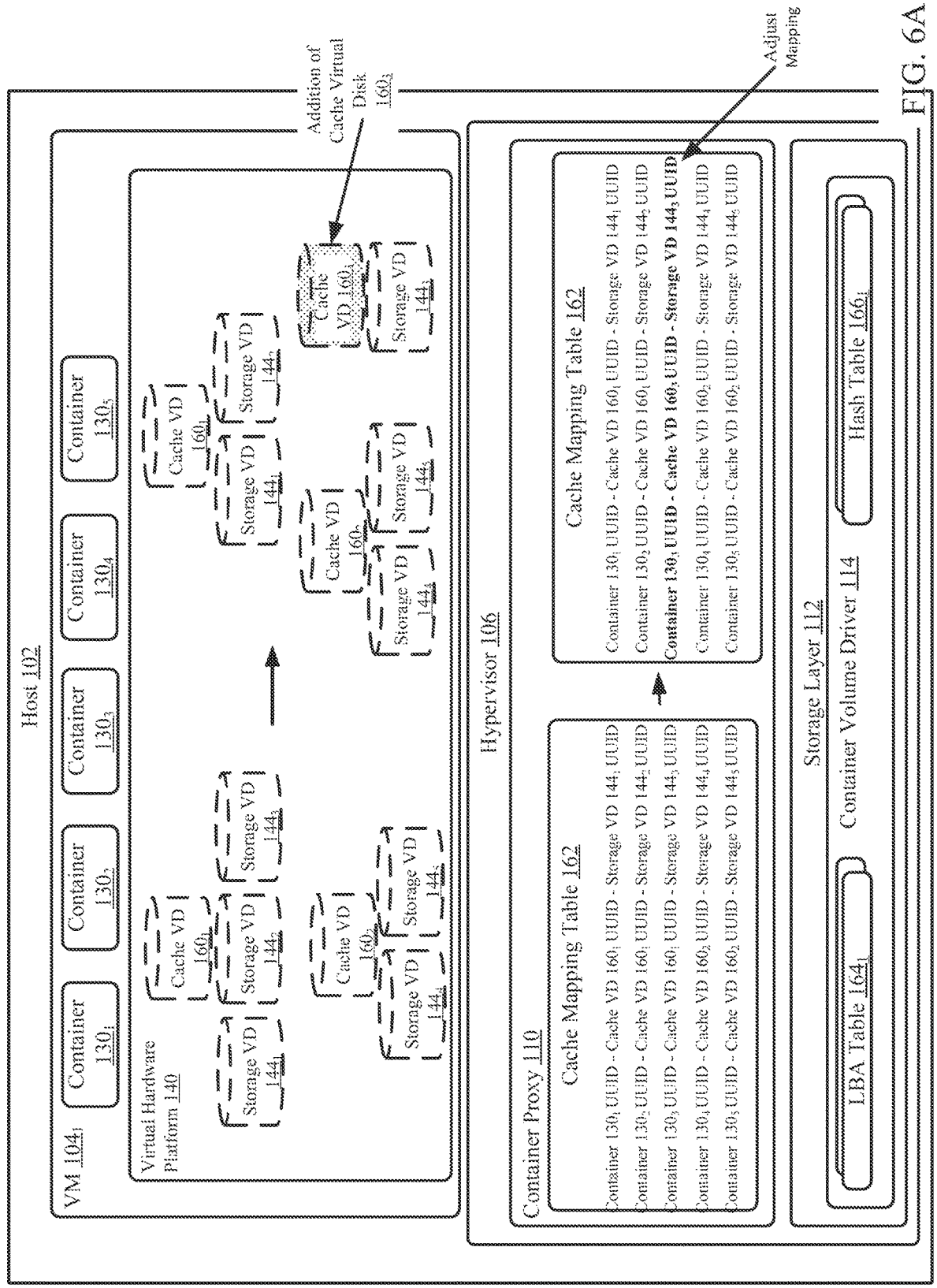
FIGS. 6A-6B depict example load balancing when a new cache virtual disk is created for a cluster, according to an example embodiment of the present application.
Figure 6B:
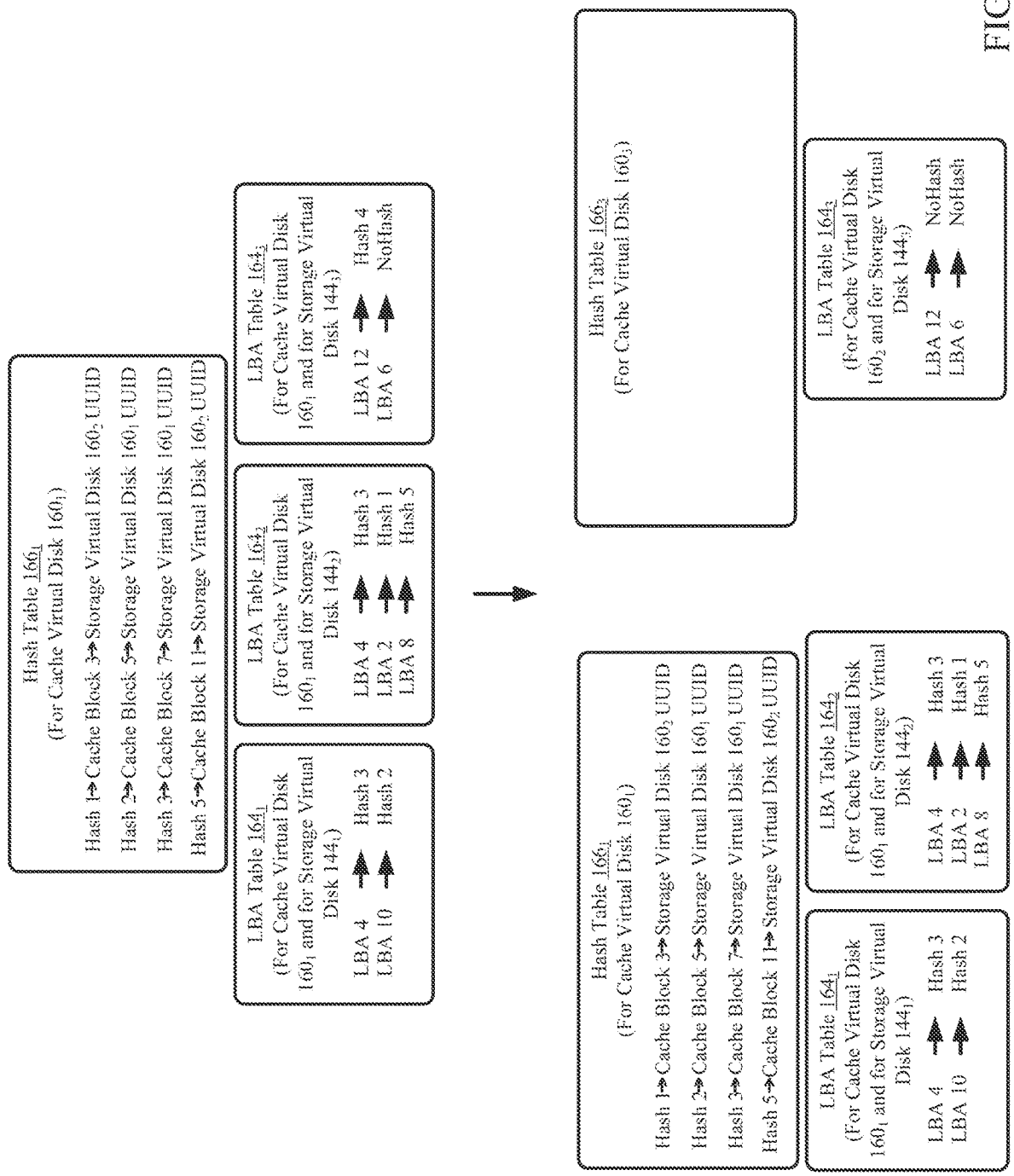

As another illustrative example, FIGS. 6A-6B depict example load balancing when a new cache virtual disk 160 is introduced in a cluster of hosts 102, as opposed to a new container 130, and its associated storage virtual disk(s), as illustrated in FIGS. 5A-5B, according to an example embodiment of the present application. As shown in FIG. 6A, similar to FIG. 5A, containers $130_{1-5}$, storage virtual disks $144_{1-5}$, and cache virtual disks $160_{1-2}$ currently exist on host 102. Accordingly, mapping maintained by container proxy 110 (e.g., in container mapping table 162) contains an entry for each container $130_{1-5}$ and its assigned cache virtual disk 160 and storage virtual disk 144. For example, an entry for container $130_1$, an entry for container $130_2$, and an entry for container $130_3$ indicates that these containers are assigned to cache virtual disk $160_1$, while an entry for container $130_4$ and an entry for container $130_5$ indicates that these containers are assigned to cache virtual disk $160_2$. Further, each container $130_{1-5}$ may be assigned its own storage virtual disk 144 (e.g., not shared with other containers 130); thus, the entry for each container $130_{1-5}$ may additionally include the UUID of the storage virtual disk 144 that is assigned to the corresponding container.

At a later time, a user may add (e.g., create and deploy) cache virtual disk $160_3$ to host 102. The addition of this cache virtual disk 160 may require container proxy 110 to adjust the mapping currently maintained in container mapping table 162. For example, container proxy 110 may adjust a mapping such that one or more storage virtual disks 144 (of one or more containers 130) previously assigned to cache virtual disk $160_1$ or cache virtual disk $160_2$ are re-assigned to cache virtual disk $160_3$. Because three storage virtual disks 144 were assigned to cache virtual disk $160_1$ and two storage virtual disks 144 were assigned to cache virtual disk $160_2$ prior to the addition of cache virtual disk $160_3$, container proxy 110 may determine to re-assign one of storage virtual disks 144 previously assigned to cache virtual disk $160_1$, such that each cache virtual disk 160, after the addition of cache virtual disk $160_3$, has at most two storage virtual disks 144 assigned (as opposed to three which were originally assigned to cache virtual disk $160_1$). In this example, container proxy 110 may determine to re-assign storage virtual disk $144_3$ for container $130_3$ to new cache virtual disk $160_3$ and update the mapping in container mapping table 162 accordingly.

In addition to adjusting the mapping maintained in container mapping table 162, an LBA table $164_3$ for storage virtual disk $144_3$ may be re-associated. In particular, as shown in FIG. 5B, prior to the addition of cache virtual disk $160_3$, LBA table $164_3$ for storage virtual disk $144_3$ was associated with hash table $166_1$ (because storage virtual disk $144_3$ was associated with cache virtual disk $160_1$). Thus, given storage virtual disk $144_3$ is now associated with cache virtual disk $160_3$ instead of cache virtual disk $160_1$, LBA table $164_3$ for storage virtual disk $144_3$ may be re-associated with hash table $166_3$ for cache virtual disk $160_3$. To perform such re-association, hash values of entries in LBA table $164_3$ may be replaced with "NoHash" (e.g., indicating that these entries cannot be currently found in the new cache virtual disk $160_3$). Further, new writes to storage virtual disk $144_3$ may be written to cache virtual disk $160_3$, and new entries may be created for LBA table $164_3$ and hash table $166_3$. It is to be noted that not all hash tables 166 and LBA tables 164 for the example illustrated in FIG. 6A are depicted in FIG. 6B.

Similar load balancing may also occur when a cache virtual disk 160 is removed from host 102 within the cluster, such that storage virtual disks 144 are evenly distributed across the available cache virtual disks 160, after a cache virtual disk 160 is removed. Further, when a cache virtual disk 160 is removed, mapping in container mapping table 162 may also be updated to readjust the mappings of containers 130 and cache virtual disks 160. Additionally, a hash table 166 for the cache virtual disk 160 may be removed, and LBA table(s) 164 associated with the hash table 166 may be re-associated.

It should be understood that, for any workflow described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for caching data in a virtualized computing system, the method comprising:

receiving, from a first application running in a first container, a first input/output (I/O) to write first data in a storage virtual disk to a block associated with a logical block address (LBA);

determining a first cache is assigned to the first container and the storage virtual disk using a container mapping table comprising a first container mapping table entry mapping the first container and the storage virtual disk to the first cache and a second container mapping table entry mapping a second container and the storage virtual disk to the first cache;

writing the first data to the block in the storage virtual disk;

writing the first data to a cache block in the first cache;

computing a hash of the first data;

adding an LBA table entry that maps the LBA to the hash in an LBA table associated with the storage virtual disk; and adding a hash table entry that maps the hash to the cache block and to the storage virtual disk in a hash table associated with the first cache.

2. The method of claim 1, wherein the first cache is implemented as a cache virtual disk.

3. The method of claim 1, further comprising:

receiving, from a second application running in the second container, a second I/O to read from the LBA;

determining the first cache is assigned to the second container and the storage virtual disk based on the second container mapping table entry in the container mapping table;

determining the LBA is associated with the hash based on the LBA table entry in the LBA table;

in response to determining the LBA is associated with the hash, determining the hash is associated with the cache block based on the hash table entry in the hash table; and based on determining the hash is associated with the cache block, reading the first data from the cache block to satisfy the second I/O.

4. The method of claim 1, further comprising:

evicting the first data from the first cache based on a least recently used (LRU) policy of the first cache;

computing the hash for the first data;

locating the hash table entry in the hash table using the computed hash;

locating the LBA table having the LBA table entry based on the hash table entry mapping the hash to the cache block and to the storage virtual disk;
removing the hash table entry from the hash table;
locating the LBA table entry in the LBA table using the computed hash; and
replacing the LBA table entry with an entry that maps the LBA to a value indicating that no hash value exists in the LBA table associated with the storage virtual disk.

5. The method of claim 4, further comprising:
receiving, from a second application running in the second container, a second I/O to read from the LBA;
determining the first cache is assigned to the second container and the storage virtual disk based on the second container mapping table entry in the container mapping table;
determining the LBA is associated with the hash based on the LBA table entry in the LBA table;
determining the LBA table entry includes the value indicating that no hash value exists; and
reading the first data from the block in the storage virtual disk.

6. The method of claim 1, wherein the container mapping table further comprises a third container mapping table entry mapping a third container and a second storage virtual disk to the first cache; and
the method further comprises:
adding a second cache to the virtualized computing system; and
assigning the second storage virtual disk to the second cache, wherein assigning the second storage virtual disk to the second cache comprises modifying the third container mapping table entry in the container mapping table to map the third container and the second storage virtual disk to the second cache.

7. The method of claim 6, further comprising:
removing the first cache from the virtualized computing system;
assigning the first container and the storage virtual disk to the second cache, wherein assigning the first container and the storage virtual disk to the second cache comprises modifying the first container mapping table entry in the container mapping table to map the first container and the storage virtual disk to the second cache;
assigning the second container and the storage virtual disk to the second cache, wherein assigning the second container and the storage virtual disk to the second cache comprises modifying the second container mapping table entry in the container mapping table to map the second container and the storage virtual disk to the second cache; and
replacing the LBA table entry with an entry that maps the LBA to a value indicating that no hash value exists in the LBA table associated with the storage virtual disk.

8. The method of claim 1, wherein:
the container mapping table further comprises a third container mapping table entry mapping a third container and a second storage virtual disk to a second cache; and
the method further comprises:
adding a fourth container and a third storage virtual disk for the fourth container to the virtualized computing system; and
assigning the fourth container and the third storage virtual disk to the second cache, wherein assigning the fourth container and the third storage virtual disk to the second cache comprises adding a fourth container mapping table entry mapping the fourth container and the third storage virtual disk to the second cache in the container mapping table.

9. The method of claim 1, wherein:
the container mapping table further comprises:
a third container mapping table entry mapping a third container and a second storage virtual disk to a second cache, and
a fourth container mapping table entry mapping a fourth container and a third storage virtual disk to a third cache, and
a fifth container mapping table entry mapping a fifth container and a fourth storage virtual disk to the third cache; and
the method further comprises:
removing the third container and the second storage virtual disk from the virtualized computing system; and
assigning the fifth container and the fourth storage virtual disk to the second cache, wherein assigning the fifth container and the fourth storage virtual disk to the second cache comprises modifying the fifth container mapping table entry in the container mapping table to map the fifth container and the fourth storage virtual disk to the second cache; and
replacing LBA entries in an LBA table associated with the fourth storage virtual disk with entries that map LBAs to values indicating that no hash value exists in the LBA table associated with the fourth storage virtual disk.

10. A system comprising:
one or more processors; and
at least one memory, the one or more processors and the at least one memory configured to:
receive, from a first application running in a first container in a virtualized computing system, a first input/output (I/O) to write first data in a storage virtual disk to a block associated with a logical block address (LBA);
determine a first cache is assigned to the first container and the storage virtual disk using a container mapping table comprising a first container mapping table entry mapping the first container and the storage virtual disk to the first cache and a second container mapping table entry mapping a second container and the storage virtual disk to the first cache;
write the first data to the block in the storage virtual disk;
write the first data to a cache block in the first cache;
compute a hash of the first data;
add an LBA table entry that maps the LBA to the hash in an LBA table associated with the storage virtual disk; and
adding a hash table entry that maps the hash to the cache block and to the storage virtual disk in a hash table associated with the first cache.

11. The system of claim 10, wherein the first cache is implemented as a cache virtual disk.

12. The system of claim 10, wherein the one or more processors and the at least one memory are further configured to:
receive, from a second application running in the second container, a second I/O to read from the LBA;
determine the first cache is assigned to the second container and the storage virtual disk based on the second container mapping table entry in the container mapping table;
determine the LBA is associated with the hash based on the LBA table entry in the LBA table;

in response to determining the LBA is associated with the hash, determine the hash is associated with the cache block based on the hash table entry in the hash table; and based on determining the hash is associated with the cache block, read the first data from the cache block to satisfy the second I/O.

13. The system of claim 10, wherein the one or more processors and the at least one memory are further configured to:

evict the first data from the first cache based on a least recently used (LRU) policy of the first cache;

compute the hash for the first data;

locate the hash table entry in the hash table using the computed hash;

locate the LBA table having the LBA table entry based on the hash table entry mapping the hash to the cache block and to the storage virtual disk;

remove the hash table entry from the hash table;

locate the LBA table entry in the LBA table using the computed hash; and replace the LBA table entry with an entry that maps the LBA to a value indicating that no hash value exists in the LBA table associated with the storage virtual disk.

14. The system of claim 13, wherein the one or more processors and the at least one memory are further configured to:

receive, from a second application running in the second container, a second I/O to read from the LBA;

determine the first cache is assigned to the second container and the storage virtual disk based on the second container mapping table entry in the container mapping table;

determine the LBA is associated with the hash based on the LBA table entry in the LBA table;

determine the LBA table entry includes the value indicating that no hash value exists; and read the first data from the block in the storage virtual disk.

15. The system of claim 10, wherein the container mapping table further comprises a third container mapping table entry mapping a third container and a second storage virtual disk to the first cache; and the one or more processors and the at least one memory are further configured to:

add a second cache to the virtualized computing system; and assign the second storage virtual disk to the second cache, wherein assigning the second storage virtual disk to the second cache comprises modifying the third container mapping table entry in the container mapping table to map the third container and the second storage virtual disk to the second cache.

16. The system of claim 15, wherein the one or more processors and the at least one memory are further configured to:

remove the first cache from the virtualized computing system;

assign the first container and the storage virtual disk to the second cache, wherein assigning the first container and the storage virtual disk to the second cache comprises modifying the first container mapping table entry in the container mapping table to map the first container and the storage virtual disk to the second cache;

assign the second container and the storage virtual disk to the second cache, wherein assigning the second container and the storage virtual disk to the second cache comprises modifying the second container mapping table entry in the container mapping table to map the second container and the storage virtual disk to the second cache; and replace the LBA table entry with an entry that maps the LBA to a value indicating that no hash value exists in the LBA table associated with the storage virtual disk.

17. The system of claim 10, wherein:

the container mapping table further comprises a third container mapping table entry mapping a third container and a second storage virtual disk to a second cache; and the one or more processors and the at least one memory are further configured to:

add a fourth container and a third storage virtual disk for the fourth container to the virtualized computing system; and assign the fourth container and the third storage virtual disk to the second cache, wherein assigning the fourth container and the third storage virtual disk to the second cache comprises adding a fourth container mapping table entry mapping the fourth container and the third storage virtual disk to the second cache in the container mapping table.

18. The system of claim 10, wherein:

the container mapping table further comprises:

a third container mapping table entry mapping a third container and a second storage virtual disk to a second cache, and a fourth container mapping table entry mapping a fourth container and a third storage virtual disk to a third cache, and a fifth container mapping table entry mapping a fifth container and a fourth storage virtual disk to the third cache; and the one or more processors and the at least one memory are further configured to:

remove the third container and the second storage virtual disk from the virtualized computing system; and assign the fifth container and the fourth storage virtual disk to the second cache, wherein assigning the fifth container and the fourth storage virtual disk to the second cache comprises modifying the fifth container mapping table entry in the container mapping table to map the fifth container and the fourth storage virtual disk to the second cache; and replace LBA entries in an LBA table associated with the fourth storage virtual disk with entries that map LBAs to values indicating that no hash value exists in the LBA table associated with the fourth storage virtual disk.

19. A non-transitory computer-readable medium comprising instructions that, when executed by one or more processors of a computing system, cause the computing system to perform operations for caching data in a virtualized computing system, the operations comprising:

receiving, from a first application running in a first container, a first input/output (I/O) to write first data in a storage virtual disk to a block associated with a logical block address (LBA);

determining a first cache is assigned to the first container and the storage virtual disk using a container mapping table comprising a first container mapping table entry mapping the first container and the storage virtual disk to the first cache and a second container mapping table entry mapping a second container and the storage virtual disk to the first cache;

writing the first data to the block in the storage virtual disk;

writing the first data to a cache block in the first cache;

computing a hash of the first data;

adding an LBA table entry that maps the LBA to the hash in an LBA table associated with the storage virtual disk; and adding a hash table entry that maps the hash to the cache block and to the storage virtual disk in a hash table associated with the first cache.

20. The non-transitory computer-readable medium of claim 19, wherein the first cache is implemented as a cache virtual disk.

* * * * *